Dec. 23, 1924.
E. P. KRAY
AEROPLANE
Filed July 9, 1923  3 Sheets-Sheet 1
1,520,292
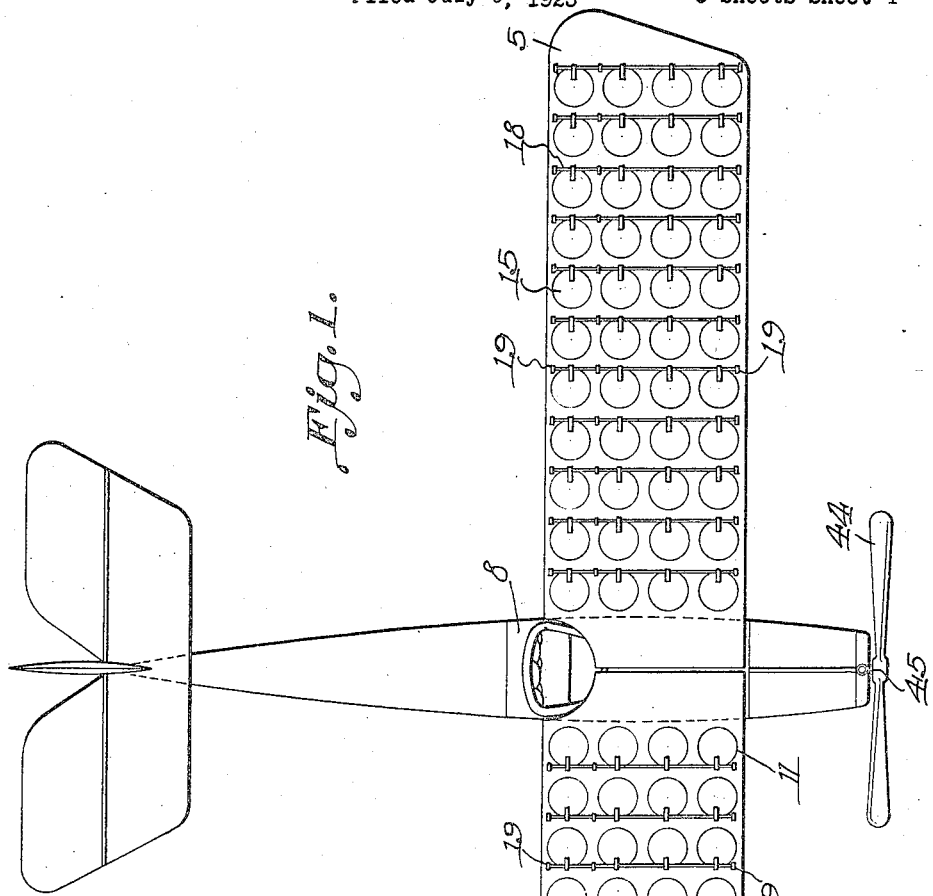
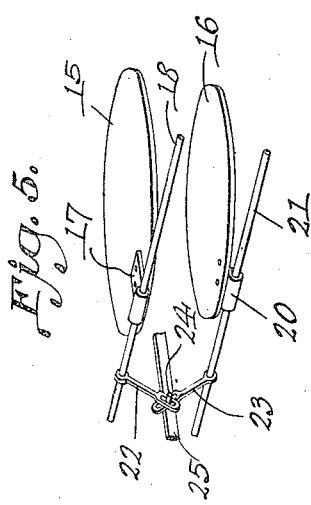
Inventor
Elmer P. Kray
By Jerry A. Mathews
Attorney

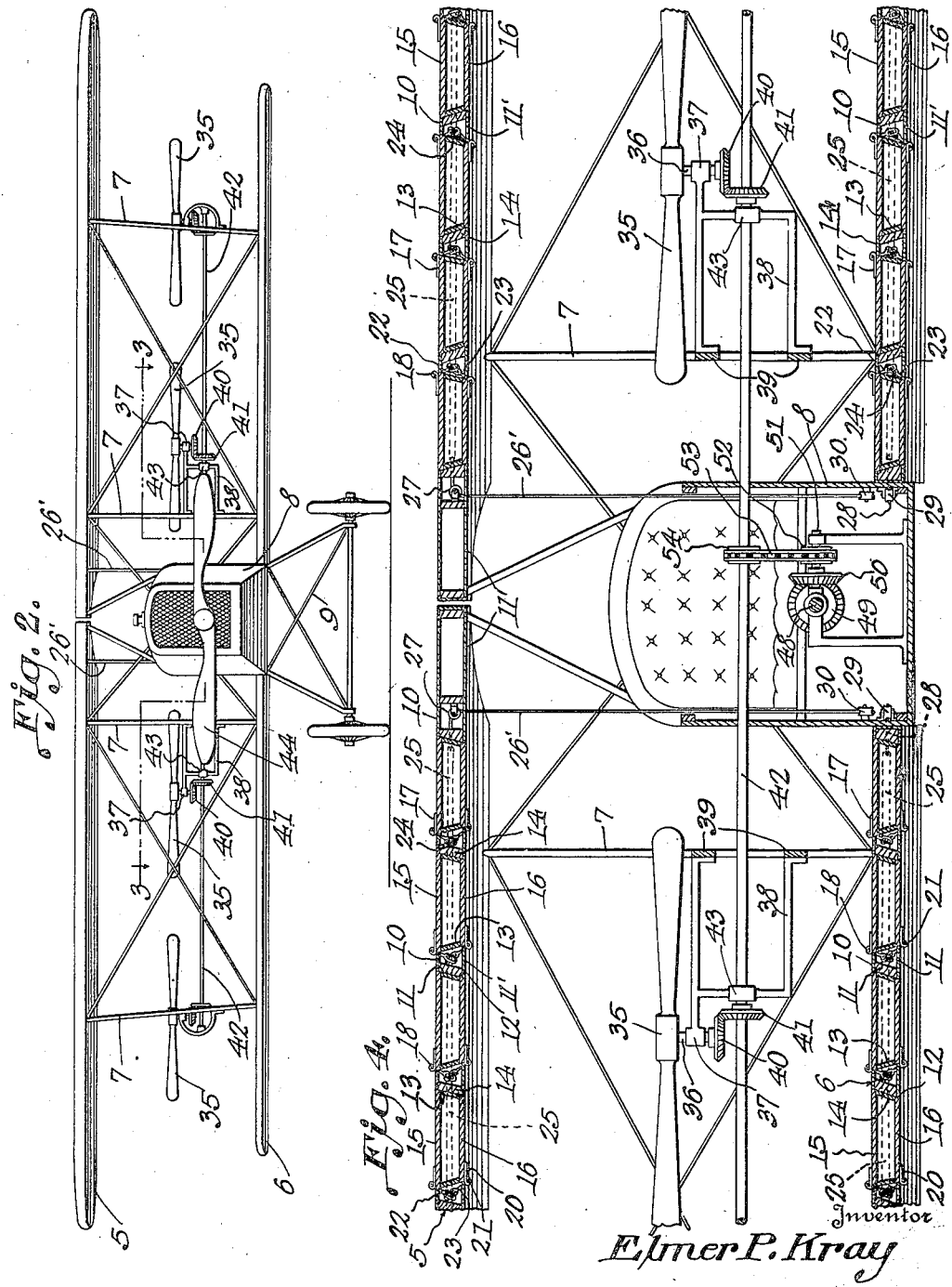

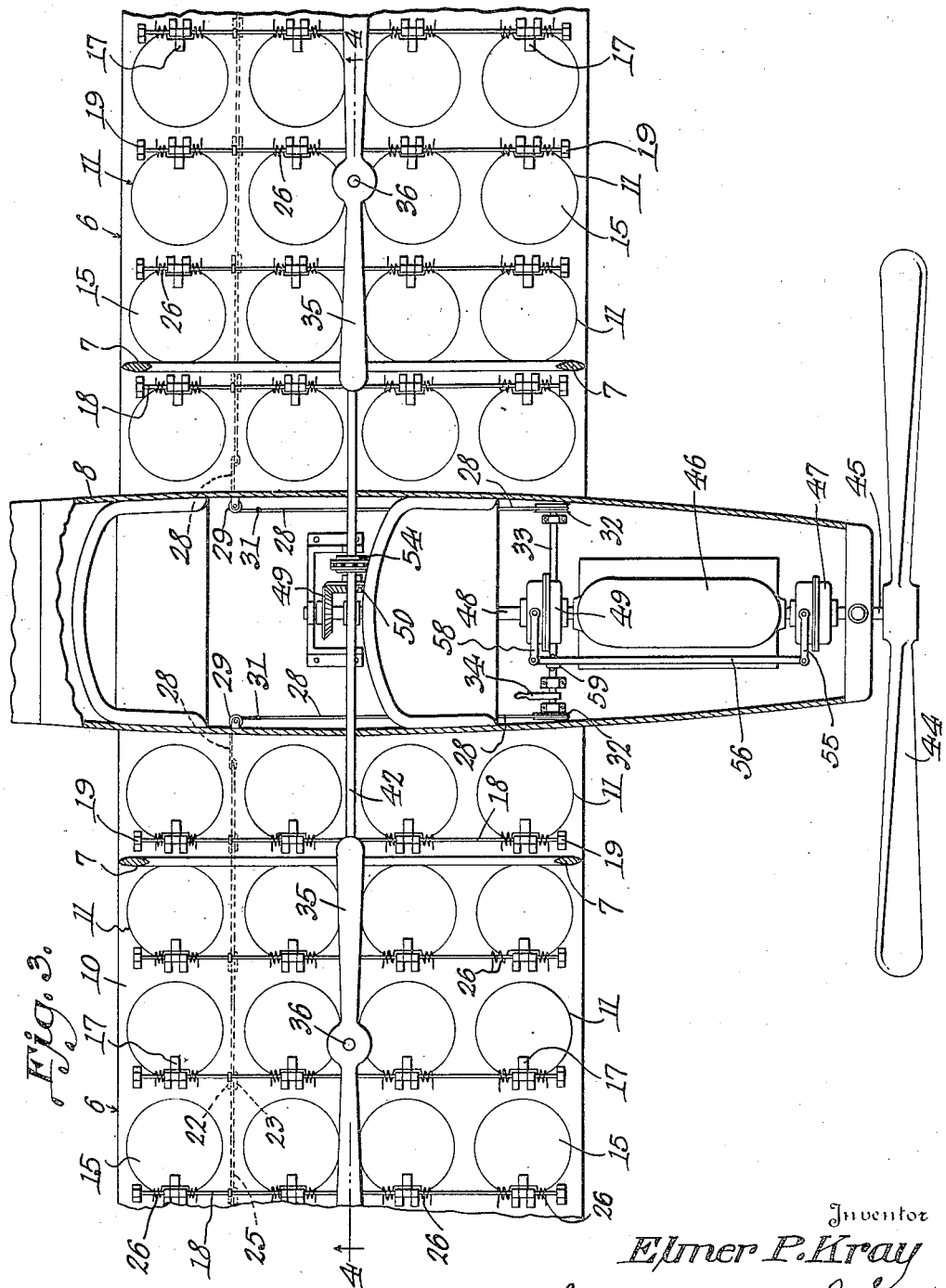

Patented Dec. 23, 1924.

1,520,292

UNITED STATES PATENT OFFICE.

ELMER P. KRAY, OF CHICAGO, ILLINOIS.

AEROPLANE.

Application filed July 9, 1923. Serial No. 650,491.

*To all whom it may concern:*

Be it known that I, ELMER P. KRAY, a citizen of the United States, residing at Chicago, in the county of Cook and State of Illinois, have invented certain new and useful Improvements in Aeroplanes, of which the following is a specification.

My invention relates to improvements in "heavier than air" flying machines.

An important object of the invention is to provide means whereby the machine may rise from the ground vertically, may cause to hover in the air, and may be driven longitudinally, at the will of the operator.

A further object of the invention is to provide a flying machine of the above mentioned character, which has means for utilizing, with the maximum efficiency, the action of the lifting propellers.

Other objects and advantages of the invention will be apparent during the course of the following description.

In the accompanying drawings, forming a part of this specification, and in which like numerals are employed to designate like parts throughout the same,—

Figure 1 is a plan view of a flying machine embodying my invention,

Figure 2 is a front elevation of the same,

Figure 3 is a horizontal section taken on line 3—3 of Figure 2,

Figure 4 is a longitudinal section taken on line 4—4 of Figure 3, and,

Figure 5 is a detail view of a pair of closure elements.

In the drawings, wherein for the purpose of illustration is shown a preferred embodiment of my invention, the numerals 5 and 6 designate upper and lower transverse sustaining planes, connected by the usual struts 7, and suitably mounted upon a fuselage 8, in turn mounted upon the usual chassis 9.

The upper and lower planes 5 and 6 are substantially identical, excepting that the upper plane is slightly longer, as shown. These planes may be constructed of any suitable material, but for the purpose of illustration they may be regarded as formed of metal. Each plane embodies upper and lower walls 10 and 11'. The upper wall 10, upon opposite sides of the fuselage, is provided with openings 11, which are preferably distributed over the area thereof in a uniform manner. While the size of these openings may of course be varied, I believe that satisfactory results can be obtained by forming these openings of 11 inches in diameter, and arranging one of these openings on each square foot of area of the upper wall. The lower wall has a corresponding number of openings 12, which would be about nine inches in diameter, if used in connection with the openings of 11 inches in diameter, in the upper plane. The openings 12 are of course concentric with relation to the openings 11. Arranged within the plane, between each pair of openings 11 and 12, which are preferably circular, is a tapered sleeve 13, circular in cross section, and decreasing in diameter downwardly. These sleeves are held within the plane by any suitable means, as by being attached to the transverse struts or members 14 of the plane and are also suitably attached to the upper and lower walls of the plane. The sleeves preferably terminate inwardly of the upper and lower walls and may be substantially flush with their inner surfaces, whereby the upper and lower closure elements 15 or 16 may engage therewith, within the opening 11, and remain substantially flush with the outer surfaces of the plane.

The closure elements 15 and 16 may be formed of metal or any other suitable material, and are adapted to snugly fit within their openings 11 and 12, to close the same. The closure elements are preferably arranged in transverse groups. The upper and lower closure elements in each pair, in each group, move outwardly in opposite directions. The upper closure element swings upwardly and the lower closure element swings downwardly.

The upper closure elements 15 in each transverse group is provided with straps 17, see more particularly Figure 5, rigidly mounted upon a transverse upper rock shaft 18, which is journaled in bearings 19, suitably secured to the plane. The lower closure elements 16 are provided with straps 20, rigidly mounted upon a lower transverse rock shaft 21, journaled in suitable bearings, identical with the bearings 19. Each pair of rock shafts 18 and 21 carry inwardly projecting cranks 22 and 23, rigidly secured thereto, and operating within suitable openings formed in the upper and lower walls of the plane. These cranks have their free ends provided with longitudinal slots, for receiving a pivot element 24, carried by a longitudinally movable rod or bar 25. The closure elements are normally held in the closed position, by tortional coil springs 26, which surround the rock shafts, and preferably engage with the straps 17 and 20, to shift the closure elements inwardly within their respective openings, whereby the closure elements are ordinarily substantially flush with the outer surfaces of the plane. When the rod or bar 25 is moved inwardly or to the right, Figure 5, it is obvious that the closure elements are automatically swung outwardly, thereby uncovering the tapered sleeves. These closure elements may be swung to substantially vertical positions.

The two actuating elements or rods 25 in the upper plane have connection at their inner ends with cables 26', passed about pulleys 27, while the rods 25 in the lower plane, are connected with cables 28, passing about pulleys 29. The cables 26' are also passed about vertical pulleys 30, and are attached to the cables 28, slightly in advance of the pulleys 29, as indicated at 31. The cables 38 extend forwardly and are adapted to be wound upon drums 32, rigidly mounted upon a transverse shaft 33, suitably supported within the fuselage. This shaft may be turned by a hand lever 34, rigidly secured thereto.

The numeral 35 designates horizontally rotating lifting propellers, which are mounted between the upper and lower planes 5 and 6, and preferably centrally of the space between the same. The distance between the upper and lower planes of the ordinary bi-plane is about four feet, and hence there is a distance of about two feet between these propellers and the planes. The propellers are carried by vertical shafts 36, journaled in bearings 37, carried by brackets 38. These brackets may be secured to transverse members 39, attached to the struts 7. The shafts 36 are driven by beveled gears 40 engaging beveled gears 41, rigidly mounted upon a transverse drive shaft, 42, journaled in suitable bearings 43. While I have shown four lifting propellers in connection with the planes, it is of course understood that the number may be varied, depending largely upon the size of the machine and the dimensions of the planes.

The numeral 44 designates a tractor propeller, employed in driving the machine longitudinally. This propeller is mounted at the forward end of the fuselage, upon a shaft 45.

Suitably mounted within the fuselage, near its forward end, is an engine 46, such as an internal combustion engine, and a clutch 47 is interposed between this engine and the shaft 45. At the rear end of the engine 46 is a shaft 48, and a clutch 49 is interposed between the shaft 48 and the crank shaft of the engine 46. The shaft 48 extends rearwardly and has a beveled gear 49 rigidly secured thereto, driving a beveled gear 50, mounted upon a counter shaft 51. This counter shaft carries a sprocket wheel 52 driving a sprocket chain 53, engaging a sprocket wheel 54, which is rigidly mounted upon the shaft 42. It might be stated at this point that when the clutch 47 is active, the clutch 49 is inactive, and vice versa. The forward clutch 47 is rendered active and inactive by means of a lever 55, pivotally connected with a link 56, having pivotal connection with a lever 58, serving to render the clutch 49 active and inactive. The link 56 is pivotally connected with a vertically swinging crank 59, rigidly mounted upon the rock shaft 33.

In operation, with the machine at rest upon the ground, and assuming that it is desired to rise in the air vertically, the lever 34 is swung forwardly, turning the rock shaft 33 forwardly. This causes the cables 28 to be wound upon the drums 32 and all of the closure elements are swung to the open position. When the rock shaft 33 turns forwardly, crank 59 swings forwardly and the levers 55 and 58 swing forwardly. The lever 55 renders its clutch 47 inactive and lever 58 renders its clutch 49 active. When the engine is now started, the tractor propeller 44 is idle, while the elevating propellers 35 are rotated. The air is therefore drawn downwardly by these elevating propellers, and caused to travel through the tapered sleeves 13, which compress the air to a considerable extent, as it approaches the lower ends of these tapered sleeves. This increases the velocity of the air passing through the tapered sleeves, causing the same to exert a lifting action upon the machine. The size and number of the openings or tapered sleeves may of course be varied, but it is preferred that the combined areas of these tapered sleeves or openings be sufficient to exhaust or pass therethrough all of the air which the propellers of a given pitch are capable of drawing, at a rated efficiency, plus the mass of air that would be met as the machine ascends through the air. When the machine has thus ascended in the air, it may be made to hold its position or hover, by regulating the speed of the engine. To travel longitudinally, when ascended, the operator swings the lever 34 rearwardly, automatically closing all of the closure elements, rendering the lifting propellers inactive, and the tractor propellers 44 active. In this manner, the machine may travel longitudinally and may land in the usual manner, if desired. While I have shown the lever 34 as manually operated, yet I contemplate connecting the same with the engine, so that it may be power driven.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. An aeroplane comprising, a fuselage, a chassis supporting the fuselage, a sustaining plane carried by the fuselage and provided with a plurality of openings extending therethrough, said openings tapering downwardly, horizontally rotating propellers arranged beneath the plane and its tapering openings, a vertically rotating propeller mounted upon the fuselage, a motor mounted upon the fuselage for driving said propellers, and means to cover and uncover said openings.

2. An aeroplane comprising, a fuselage, a chassis supporting the fuselage, a sustaining plane carried by the fuselage and provided with a plurality of openings extending therethrough, said openings tapering downwardly, horizontally rotating propellers arranged beneath the plane and its tapered openings, a vertically rotating propeller mounted upon the fuselage, a motor mounted upon the fuselage, a clutch adapted when active to cause the motor to drive the vertically rotating propeller, a second clutch adapted when active to cause the motor to drive the horizontally rotating propeller, closure means for said tapered openings, and common means for closing the closure means and rendering the clutch of the vertically rotating propeller inactive and the clutch of the horizontally rotating propellers active.

3. An aeroplane comprising, a fuselage, supporting means for the same, a sustaining plane carried by the fuselage and having a plurality of openings formed therein, closure elements to cover and uncover said openings, horizontally rotating propellers mounted beneath said plane, a vertically rotating propeller mounted upon the fuselage, a motor mounted upon the fuselage, a clutch adapted when active to cause the motor to drive the vertically rotating propeller, a second clutch adapted when active to cause the motor to drive the horizontally rotating propellers, means connecting said clutches whereby one is simultaneously rendered inactive while the other is rendered active, and means to simultaneously move the closure elements to the open position and shift the connecting means for rendering the clutch of the horizontally rotating propellers active.

4. An aeroplane comprising, a fuselage, supporting means for the same, a sustaining plane carried by the fuselage and having a plurality of openings formed therein, swinging closure elements for said openings, a rock shaft arranged adjacent to said closure elements and adapted to shift them to the open position, spring means to move the closure elements to the closed position, means to turn the rock shaft in one direction, horizontal propellers mounted upon one side of the plane, a vertical propeller mounted upon the fuselage, and a motor mounted upon the fuselage for driving said propellers.

5. An aeroplane comprising, as a subcombination, a sustaining plane provided with a row of openings extending therethrough, sets of swinging closure elements arranged at the top and bottom of the plane adjacent to the openings to cover and uncover the same, and means to simultaneously swing the closure elements in opposite directions.

6. In an aeroplane, as a subcombination, a sustaining plane provided with a plurality of openings extending therethrough, said openings tapering downwardly, and horizontally rotating propellers mounted beneath the sustaining plane near the reduced lower ends of the openings for drawing air downwardly through such openings, the taper of the openings increasing the velocity of the air for providing a reacting lifting action, the cross sectional areas of the openings being adjusted with relation to the efficiency of the propellers to permit of the passage of the air drawn downwardly by the propellers plus the volume of air met upon the rising action of the plane.

In testimony whereof I affix my signature.

ELMER P. KRAY